UNITED STATES PATENT OFFICE.

WILLIAM G. LINDSAY, OF NEW YORK, N. Y., ASSIGNOR TO THE CELLULOID COMPANY, OF NEW YORK, N. Y., A CORPORATION OF NEW JERSEY.

SOLVENT FOR NITROCELLULOSE.

1,027,617.  Specification of Letters Patent.  Patented May 28, 1912.

No Drawing.  Application filed August 11, 1911. Serial No. 643,482.

*To all whom it may concern:*

Be it known that I, WILLIAM G. LINDSAY, a citizen of the United States, residing in the city of New York, State of New York, have invented certain new and useful Improvements in Solvents for Nitrocellulose, of which the following is a specification.

The various compositions to which the present invention relates are employed in the arts mainly, as imitations of natural substances and in films used for photographic and therapeutic purposes, and consists of soluble pyroxylin or nitrocellulose combined with or dissolved in certain other substances or menstrua known as solvents of pyroxylin.

Although the final or useful form of the different compounds of this class is that of a solid or dried material, the different processes of conversion into this final solid form involve, as is well understood, the employment of pyroxylin solutions or mixtures, of varying consistency as to plasticity, stiffness or fluidity, dependent generally upon the proportion and kind of solvent used to the amount of the pyroxylin.

There are two classes of solvents—liquid solvents, of which methyl alcohol, or wood spirit, is a good example, and solid solvents, of which camphor is a good representative. Solvent mixtures are also formed by combining two or more substances with each other. The components of the mixed solvent in such a case may not necessarily be possessed of individual solvent power. For instance, alcohol, which is practically a non-solvent in itself, forms a good solvent mixture when camphor is dissolved in it. The various applications of this art require the employment of complex mixtures in the solvent,—single substances being rarely used for such purposes; hence, while the advancement of the art has depended largely on the discovery and application of new single solvents, yet it has required also the invention of combinations of solvents by which effects are produced quite different from those produced when single solvents are employed alone.

The action of some solvents or diluents is quite distinct from that of others, liquid or solid, in that they require a shorter or longer time for seasoning of the material, and in the case of a solid solvent they leave it incorporated with the resulting dried product after the evaporation of the liquid solvent so that it can be molded into forms under heat and pressure.

I have discovered that ethylenechlorhydrin $CH_2ClCH_2OH$ is a valuable solvent of nitro cellulose. It has a boiling point of about 129° C., is substantially insoluble in water; is stable and the resulting products, such as films, varnishes, coatings, sheets, solid objects, etc., are substantially free from odor.

As one example of carrying out my invention practically I proceed as follows: I take one part of nitrocellulose and introduce it into ten parts by weight of ethylenechlorhydrin. The nitrocellulose dissolves slowly; the solution is promoted by stirring and suitable mixing. The solution thus prepared may be used alone or with other solvents or non-solvent liquids such as methyl or ethyl alcohol, acetone, ethyl acetate, etc.

Films or solid objects prepared by allowing the solutions to evaporate are particularly tough and flexible and substantially without odor unless camphor has been used.

What I claim and desire to secure by Letters Patent is:

1. A new composition of matter consisting of a solution of nitrocellulose in ethylenechlorhydrin.

2. A new composition of matter consisting of a solution of nitrocellulose in ethylenechlorhydrin in admixture with other solvents, substantially as described.

3. A new composition of matter consisting of a solution of nitrocellulose in ethylenechlorhydrin in admixture with other solvents and solid matters such as coloring matters and inert material.

WILLIAM G. LINDSAY.

Witnesses:
J. E. HINDON HYDE,
MABEL DENTON.